(12) United States Patent
Coburn

(10) Patent No.: US 11,025,983 B2
(45) Date of Patent: Jun. 1, 2021

(54) ELECTRONIC PROGRAM GUIDE DISPLAYING RELEVANT FIELD BASED ON TIME OF DAY

(71) Applicant: InterDigital Madison Patent Holdings, SAS, Paris (FR)

(72) Inventor: Matthew Joseph Coburn, Redondo Beach, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 502 days.

(21) Appl. No.: 15/533,059

(22) PCT Filed: Oct. 30, 2015

(86) PCT No.: PCT/US2015/058242
§ 371 (c)(1),
(2) Date: Jun. 5, 2017

(87) PCT Pub. No.: WO2016/089512
PCT Pub. Date: Jun. 9, 2016

(65) Prior Publication Data
US 2017/0347145 A1    Nov. 30, 2017

Related U.S. Application Data

(60) Provisional application No. 62/087,368, filed on Dec. 4, 2014.

(51) Int. Cl.
*H04N 5/445* (2011.01)
*H04N 21/431* (2011.01)
(Continued)

(52) U.S. Cl.
CPC ..... *H04N 21/4314* (2013.01); *H04N 21/4532* (2013.01); *H04N 21/4755* (2013.01);
(Continued)

(58) Field of Classification Search
CPC ........... H04N 21/4314; H04N 21/4532; H04N 21/4821; H04N 21/4858; H04N 21/8133; H04N 21/845; H04N 21/4147
(Continued)

(56) References Cited

U.S. PATENT DOCUMENTS

2003/0110500 A1* 6/2003 Rodriguez ............. H04H 60/46
725/46
2005/0076364 A1 4/2005 Dukes et al.
(Continued)

OTHER PUBLICATIONS

ISR for PCT/2015/058242 dated Jan. 8, 2016.

*Primary Examiner* — Jivka A Rabovianski
(74) *Attorney, Agent, or Firm* — Invention Mine LLC

(57) ABSTRACT

A method for programming an electronic program guide (EPG) grid guide is disclosed herein. The method includes determining EPG metadata from a database, sorting metadata based on a time and a metadata field, determining the metadata field to be displayed, and rendering the EPG grid guide based on the time and the metadata field. A method for programming a set top box (STB) is also disclosed herein. The method includes providing a time of day, receiving a user's viewing preferences, adjusting information based on the user's viewing preferences in at least one application, wherein the user's viewing preferences are a function of the time of day, and transmitting the adjusted information to a display device.

8 Claims, 5 Drawing Sheets

400

| | 7:00 | 7:30 | 8:00 | 8:30 | 401 |
|---|---|---|---|---|---|
| ABC | Tom Cruise, John Tesh, Jenna Elfman | | | | |
| CBS | Bruce Jenner, Julia Roberts, Pet Shop Boys    403 | | | | |
| NBC | Mila Kunis, George Clooney, Tom Brady | | | | |

402

(51) Int. Cl.
*H04N 21/485* (2011.01)
*H04N 21/81* (2011.01)
*H04N 21/475* (2011.01)
*H04N 21/45* (2011.01)
*H04N 21/482* (2011.01)
*H04N 21/845* (2011.01)
*H04N 21/4147* (2011.01)

(52) U.S. Cl.
CPC ..... *H04N 21/4821* (2013.01); *H04N 21/4858* (2013.01); *H04N 21/8133* (2013.01); *H04N 21/845* (2013.01); *H04N 5/445* (2013.01); *H04N 21/4147* (2013.01); *H04N 21/8173* (2013.01)

(58) Field of Classification Search
USPC ................ 725/39, 40, 42, 43, 46, 49, 45, 51
See application file for complete search history.

(56) References Cited

U.S. PATENT DOCUMENTS

| | | |
|---|---|---|
| 2006/0123448 A1* | 6/2006 | Ma ................... H04N 21/41407 725/51 |
| 2008/0005764 A1 | 1/2008 | Arling et al. |
| 2008/0092169 A1 | 4/2008 | Shannon et al. |
| 2008/0127269 A1 | 5/2008 | Chicles |
| 2009/0070809 A1 | 3/2009 | Kendall et al. |
| 2010/0333133 A1 | 12/2010 | Krakirian et al. |
| 2011/0239253 A1 | 9/2011 | West et al. |
| 2012/0317085 A1 | 12/2012 | Green et al. |
| 2014/0053197 A1* | 2/2014 | Shoykher ................ G06F 3/017 725/41 |

* cited by examiner

300

| | 7:00 | 7:30 | 8:00 | 8:30 | 301 |
|---|---|---|---|---|---|
| ABC | Good Morning America 303 | | | | |
| CBS | This Morning (CBS) | | | | |
| NBC | Today | | | | |

| | 7:00 | 7:30 | 8:00 | 8:30 | 401 |
|---|---|---|---|---|---|
| ABC | Tom Cruise, John Tesh, Jenna Elfman | | | | |
| CBS | Bruce Jenner, Julia Roberts, Pet Shop Boys 403 | | | | |
| NBC | Mila Kunis, George Clooney, Tom Brady | | | | |

ELECTRONIC PROGRAM GUIDE DISPLAYING RELEVANT FIELD BASED ON TIME OF DAY

This application claims the benefit, under 35 U.S.C. § 365 of International Application PCT/US2015/058242, filed Oct. 30, 2015, which was published in accordance with PCT Article 21(2) on Jun. 9, 2016 in English and which claims the benefit of U.S. provisional patent application No. 62/087,368, filed Dec. 4, 2014.

FIELD OF INVENTION

This application is in the field of electronic program guides (EPGs) used by a client device, for example a set top box (STB), digital video recorder (DVR), and the like. The application is also in the field of providing an enhanced electronic program guide for such devices.

BACKGROUND

The proliferation of subscription television programming, the increasing number of available channels, and the corresponding increase in television programming have led to continued development of onscreen program directories and guides. Such onscreen programming solutions, collectively referred to herein as electronic program guides, have ranged from program information for each channel scrolling vertically across the screen to user controllable interfaces that allow users to examine scheduling information describing television programs currently on-air and to be broadcast in the future.

In direct broadcast satellite (DBS) systems, EPG information is periodically downloaded and updated, usually at regular intervals. Prior art approaches have allowed users to examine scheduling information that has been downloaded to the client device, either by scrolling sequentially through listings corresponding to one-half hour or hour increments or by directly accessing individual timeslots. Further, some EPGs may allow a user to directly access desired programs or even set programs to be recorded automatically.

Known EPGs provide access to program information in various ways. EPGs generally provide program information, such as the channel, the time slot and duration, and the title of the program. Other information about the program, such as a brief description of the content and/or the names of the actors, may also be presented. Known EPGs also provide limited user interactivity, such as moving between time slots to view program information and setting current or future programs for recording.

SUMMARY

A method for programming an electronic program guide (EPG) grid guide is disclosed herein. The method includes determining EPG metadata from a database, sorting metadata based on a time and a metadata field, determining the metadata field to be displayed, and rendering the EPG grid guide based on the time and the metadata field.

A method for programming a set top box (STB) is also disclosed herein. The method includes providing a time of day, receiving a user's viewing preferences, adjusting information based on the user's viewing preferences in at least one application, wherein the user's viewing preferences are a function of the time of day, and transmitting the adjusted information to a display device.

BRIEF DESCRIPTION OF THE DRAWING(S)

FIG. 3 is an example of an EPG grid guide with the show titles;

FIG. 4 is an example of an EPG grid guide with the guests appearing on a show;

DETAILED DESCRIPTION OF THE PREFERRED EMBODIMENT(S)

It is to be understood that the figures and descriptions of embodiments have been simplified to illustrate elements that are relevant for a clear understanding of the invention, while eliminating other elements and steps that are well known in the art and do not facilitate a better understanding of the present invention.

An electronic program guide (EPG) is described herein that changes what field is displayed depending on the time of day. Other criteria may be used to display a program's attributes in view of user preferences. Standard EPGs may rank programs based on popularity in a guide. The guides do not, however, change how fields are displayed. Instead of merely displaying the same type of information for an EPG, the EPG described herein will vary what fields are of importance throughout the day.

Additionally, applications that include large quantities of metadata, for example set top box (STB) applications may also vary what fields are of importance throughout the day. For example, a STB application may be Netflix, Hulu, and the like.

Figure 1:
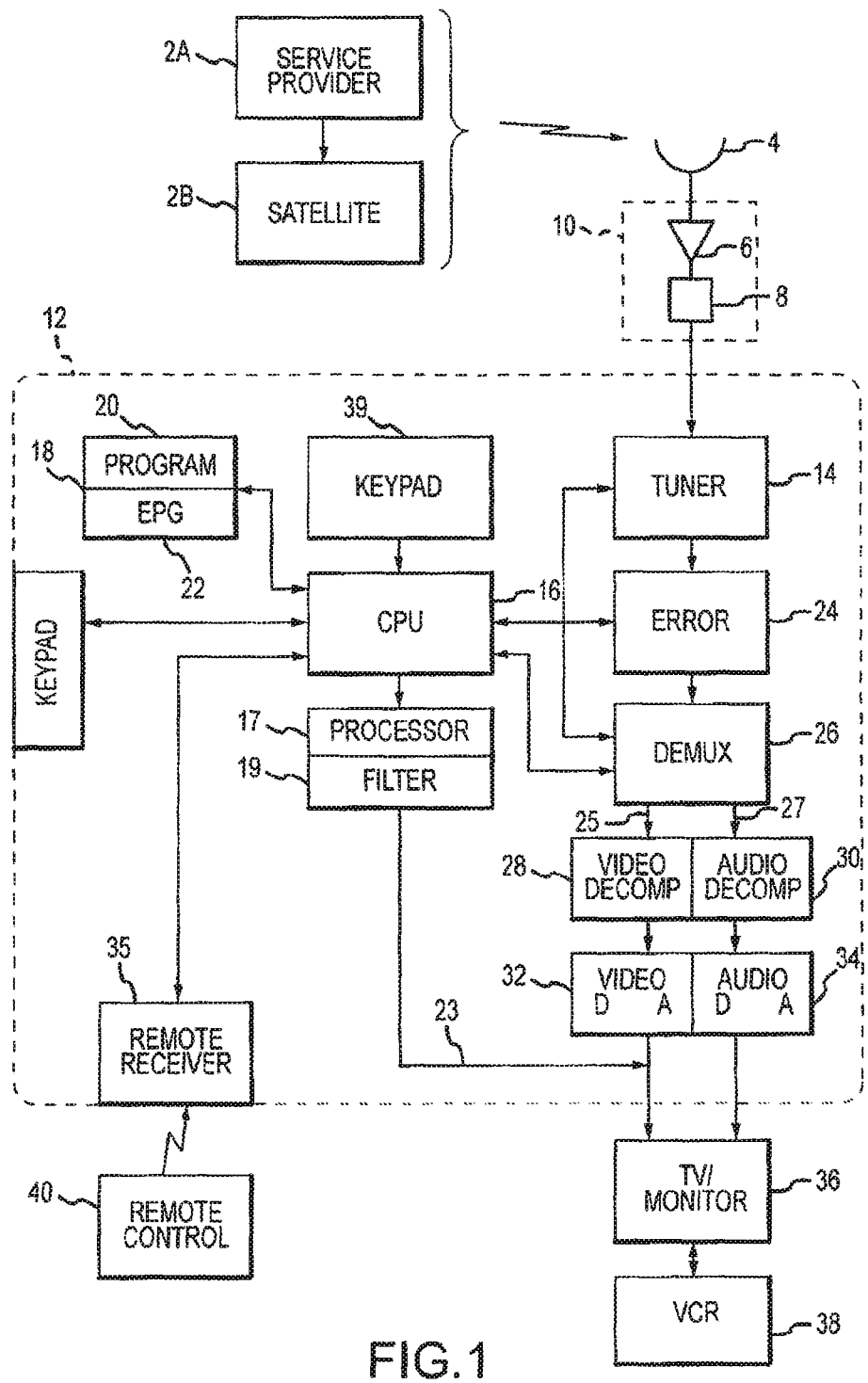
FIG. 1 is a block diagram of a relationship between a service provider, a satellite receiver, and a television.

FIG. 1 is a block diagram of a relationship between a service provider, a satellite receiver, and a television. Encrypted direct broadcast satellite (DBS) signals may be transmitted from a source 2, such as a television service provider 2A via a satellite 2B. Such signals may be received as downlink signals by a satellite antenna 4. Front end processing of the satellite signals may be accomplished by a low noise block converter feed (LNBF) provided in the antenna focal point. This may include a converter module 10 with a low noise amplifier 6, which receives the signals from the feed, and by a down converter 8, which converts the entire frequency band of the satellite signals to a lower frequency range that may be efficiently transmitted, for example, via coaxial cable to a client device, such as a satellite receiver 12. A tuner 14 may select a specific channel from the downlinked signal 2 and feed the selected channel to an error correction and packet synchronization module 24. The error correction and packet synchronization module 24 may output a fully compliant transport stream, which may be directed to a packet demultiplexer 26. Various encoding or formats may be used.

The packet demultiplexer 26 may be an integrated circuit that accepts the packetized, time domain multiplexed data stream of the transport stream and routes the packets to various areas within the satellite receiver 12. Audio may be output as an audio stream 27, which may be accepted by an audio decompresser 30. Video may be output as a video stream 25, which may be accepted by a video decompresser 28. The audio stream 27 and the video stream 25 may be fully compliant audio and video program elementary streams, respectively. In addition to routing packets of data, the packet demultiplexer 26 may also descramble encrypted data, provide various buffering of the formatted data, and handle a program clock reference to keep a local clock synchronized with the clock at the uplink center (for example, service provider 2A). Data 29 may be output from the demultiplexer 26 and routed to a central processing unit (CPU) 16, which may assemble the data 29 into an EPG 22 stored in a memory or other storage medium 18.

The video decompresser 28 and the audio decompresser 30 may accept one or more video stream 25 and/or audio stream 27, respectively, and decompress them into baseband digital signals. The video stream 25 may then fed to a video digital to analog converter 32 and the audio stream 27 may be fed to a video digital to analog converter 34. The converters 32 and 34 may decode the digital signals and output resulting analog baseband signals to a TV/monitor 36 and/or a VCR device 38.

The EPG 22 may comprise a database or otherwise access a database containing information including, for example, names or titles of viewing events (programs), corresponding channel numbers and names, brief descriptions of the programs, start and finish times, and rating and content information related to the events. The central processing unit 16 may execute an EPG program 20, which may take the information stored in the EPG 22 and output a graphic file to a processor 17. The processor 17 may process the graphic file and output a signal, which, after being filtered by a filter 19, may become a video baseband signal 23 that may be combined with the video baseband signal 23 to be displayed on the television/monitor 36.

A user may manipulate the satellite receiver 12 via a keypad 39 or a remote control device 40. The remote control device 40 may communicate with the CPU 16 by sending an infrared, radio frequency, or other wired or wireless signal to a remote receiver 35, which may transfer commands to the CPU 16.

The EPG program 20 may comprise an instruction set that creates the EPG 22 and allows a user to manipulate the EPG 22, as discussed further below. While the EPG program 20 may be implemented as hardware, the EPG program 20 may alternatively or additionally comprise a software program stored in the memory 18. Memory 18 may be random access memory (RAM), but also may be flash, ferroelectric, or other nonvolatile memory, or conventional RAM with a battery backup. An LSI 64002 microprocessor may be used for the central processing unit 16. Also, the processor 17 may be an NTSC processor, such as the Sony CXD 1910, or anything else suitable.

Figure 2:
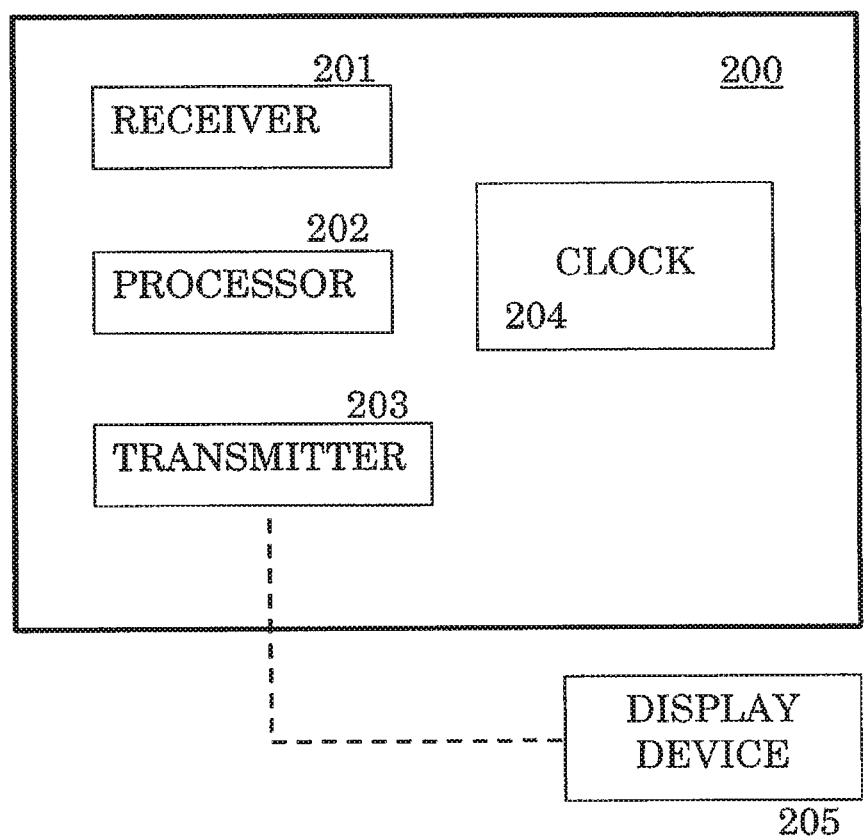
FIG. 2 is an example of a set top box (STB)

FIG. 2 is an example of a STB. The STB 200 may include a receiver 201, a processor 202, a transmitter, 203, and a clock 204. The receiver 201 receives input from a user regarding the user's preference of metadata based on a time of day. The processor 202 manages the user's preferences and adjusts information based on the user's preferences to various applications throughout the day. The adjusted information may affect the details related to the various applications, for example, title, actor, genre, guests, episode number, and the like. Specifically, more or less detail may be displayed based on the time of day. The transmitter 203 transmits the adjusted information to a display device 205. The clock 204 is used to tell the time. Based on the input of the user's preferences and the time of day, the processor 202 will adjust the output that the transmitter 203 transmits to the display device 205.

A listing of program selections may be provided, preferably broadcast programming selections that are transmitted during different times of the day. The list of programming selections can be embodied in an EPG grid guide where one axis corresponds to a time of day while the second axis corresponds to a broadcast/media asset source. Program titles and information about such programs are shown within the cells of the program guide grid. The EPG being displayed is the main screen EPG grid guide, which is typically shown in the grid guide. A user can get more information about a particular show by pressing an info button, which would show information as shown in the fields displayed. For a given broadcast program, the following fields for metadata may be used: title, actor, genre, guests, episode number, and first run/rerun.

A framework is provided herein for varying what fields are shown at different times of the day. For example, instead of showing the titles of all the morning talk shows such as "Today", "Good Morning America", and "CBS This Morning", the guests slated for each of the respective shows would be shown in the EPG grid guide.

FIG. 3 is an example of an EPG grid guide with the show titles. The time of the show 301 is shown along the x-axis. The broadcast/media asset source 302 is shown along the y-axis. The show title, for example 303, is shown within the EPG grid guide 300.

FIG. 4 is an example of an EPG grid guide with the guests appearing on a show. The time of the show 401 is shown along the x-axis. The broadcast/media asset source 402 is shown along the y-axis. The guests appearing on a show, for example 403, is shown within the EPG grid guide 400.

The EPG grid guide can be programmed to show the content of different metadata fields at different times of the day. For example, guests may be shown from 7 am-10 am, genre may be shown from 10 am-2 pm, guests may be shown from 2 pm-5 pm, titles may be shown from 5 pm-11 pm, guests may be shown from 11 pm-1 am, and title may be shown from 1 am-7 am. The arrangement of such metadata fields can be changed in accordance with a user preference, user profile, and the like.

An option may allow the user to specify conditions for the EPG grid guide. The user can have specific fields shown when a particular event occurs. For example, the user can specify for a television show with a specific title that an alternative metadata field be shown. That is, if the show title "Ellen" will be/is being broadcasted, the EPG grid guide would display the metadata associated with the guest field, while if the show "Lost" will be/is being broadcasted, the EPG grid guide would display the metadata associated with the episode number. Rules can be further set up where additional metadata field can be listed as well, such as episode number and actors.

Figure 5:
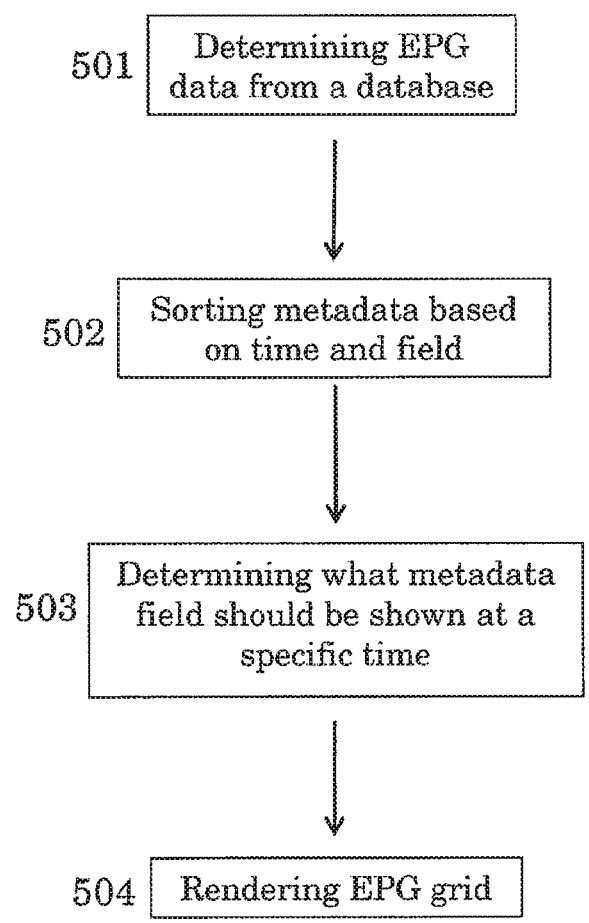
FIG. 5 is an example flowchart for rendering the EPG grid guide.

FIG. 5 is an example flowchart for rendering the EPG grid guide. The EPG data may be retrieved from a database 501. The EPG is sorted by time/metadata field 502. Based on a user profile/rules programmed by a user/default, a determination is made as to what metadata field should be shown in the EPG 503. The corresponding metadata field(s) is then shown in the EPG grid guide 504.

Figure 6:
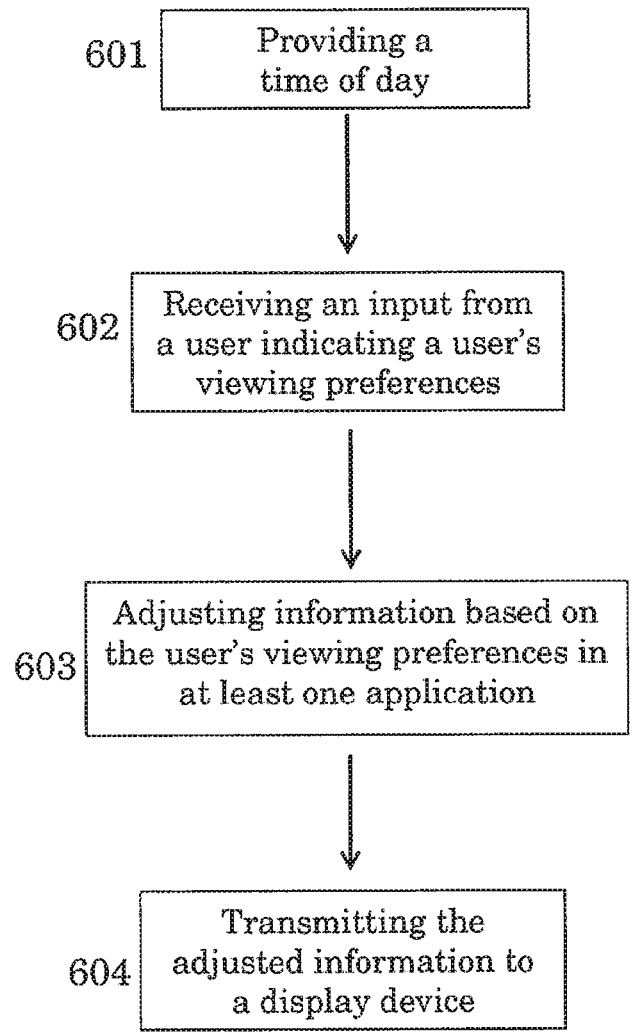
FIG. 6 is an example flowchart for programming a set top box (STB).

FIG. 6 is an example flowchart for programming a set top box (STB). A time of day may be provided 601. A receiver may receive an input from a user, indicating a user's viewing preferences 602. A processor may adjust information based on the user's viewing preferences in at least one application 603, wherein the user's viewing preferences are a function of the time of day. A transmitter may transmit the adjusted information to a display device 604.

While embodiments of the invention have been described, it will be appreciated that modifications of these embodiments are within the true spirit and scope of the invention. The invention is not limited to any particular element(s) that perform(s) any particular function(s) and some may not necessarily occur in the order shown. For example, in some cases two or more method steps may occur in a different order or simultaneously. Although illustrated in the context of separate functional elements, these functional elements may be embodied in one, or more, integrated circuits (ICs). Similarly, although shown as separate elements, any or all of the elements may be implemented in a stored-program-controlled processor, e.g., a digital signal processor, which executes associated software, e.g., corresponding to one, or more, of the functions. These and other variations of the methods disclosed herein will be readily apparent, especially in view of the description of the method described herein, and are considered to be within the full scope of the invention.

The invention claimed is:

1. A method for programming a set top box (STB), the method comprising:
   providing a time of day;
   receiving a user's viewing preferences;
   receiving a user's specified conditions for showing fields in an electronic program guide (EPG);
   adjusting information based on the user's viewing preferences in at least one application, wherein the user's viewing preferences are a function of the time of day and determining which of the fields should be shown in the EPG based on the user's specified conditions; and
   transmitting the adjusted information and the EPG with the specified fields shown based on the user's specified conditions to a display device.

2. The method of claim 1, wherein the adjusted information is minimized at a specific time of day.

3. The method of claim 1, wherein the adjusted information is maximized at a specific time of day.

4. The method of claim 1, wherein the adjusted information is selected from the group consisting of: title, actor, genre, guests, and episode number.

5. The method of claim 1, wherein the at least one application is selected from the group consisting of: Netflix and Hulu.

6. A set top box (STB) comprising:
   a clock configured to provide a time of day;
   a receiver configured to receive a user's viewing preferences and to receive a user's specified conditions for showing fields in an electronic program guide (EPG);
   a processor configured to adjust information based on the user's viewing preferences in at least one application, wherein the user's viewing preferences are a function of the time of day and to determine which of the fields should be shown in the EPG based on the user's specified conditions; and
   a transmitter configured to transmit the adjusted information and the EPG with the specified fields shown based on the user's specified conditions to a display device.

7. The STB of claim 6, wherein the adjusted information is minimized at a specific time of day.

8. The STB claim 6, wherein the adjusted information is maximized at a specific time of day.

* * * * *